(12) United States Patent
You

(10) Patent No.: US 12,460,934 B2
(45) Date of Patent: Nov. 4, 2025

(54) SYSTEMS AND METHODS FOR PROVIDING MOBILITY SERVICES

(71) Applicants: HYUNDAI MOTOR COMPANY, Seoul (KR); KIA CORPORATION, Seoul (KR)

(72) Inventor: Kyungjin You, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 409 days.

(21) Appl. No.: 17/546,962

(22) Filed: Dec. 9, 2021

(65) Prior Publication Data

US 2023/0064981 A1 Mar. 2, 2023

(30) Foreign Application Priority Data

Aug. 31, 2021 (KR) ........................ 10-2021-0115783

(51) Int. Cl.
*G01C 21/34* (2006.01)
*G06Q 10/02* (2012.01)
(Continued)

(52) U.S. Cl.
CPC ......... *G01C 21/3423* (2013.01); *G06Q 10/02* (2013.01); *G06Q 30/0284* (2013.01); *G06Q 50/40* (2024.01); *H04W 4/023* (2013.01)

(58) Field of Classification Search
CPC ............... G01C 21/3423; G06Q 10/02; G06Q 30/0284; G06Q 50/40; H04W 4/023
(Continued)

(56) References Cited

U.S. PATENT DOCUMENTS 11,808,587 B2 * 11/2023 Gerrese .................. G06Q 10/02
12,123,737 B2 * 10/2024 Gulati ................ G01C 21/3626
(Continued)

FOREIGN PATENT DOCUMENTS

KR 20170136451 A 12/2017
KR 20210085544 A 7/2021

*Primary Examiner* — Anil K Bhargava
(74) *Attorney, Agent, or Firm* — Lempia Summerfield Katz LLC

(57) ABSTRACT

A method of providing a mobility service includes: receiving a users personal information and service request information from a user terminal and receiving transportation means data from a traffic API through a service providing terminal; determining a plurality of transportation means according to a preference of the transportation means included in the service request information through the service providing terminal; determining whether there is a first public transportation means capable of moving from a departure point to a destination without a transfer through the service providing terminal; if a plurality of transportation means include a public transportation means; determining whether a residual distance of a path through which the first public transportation means moves exceeds a predetermined distance through the service providing terminal if there is a first public transportation means capable of moving without transferring; and determining whether to use a combination of the first public transportation means and the shared transportation means through the service providing terminal if the residual distance exceeds the predetermined distance.

16 Claims, 10 Drawing Sheets

(51) Int. Cl.
*G06Q 30/0283* (2023.01)
*G06Q 50/40* (2024.01)
*H04W 4/02* (2018.01)

(58) Field of Classification Search
USPC ........................................................ 701/533
See application file for complete search history.

(56) References Cited

U.S. PATENT DOCUMENTS

| | | | | |
|---|---|---|---|---|
| 2009/0119001 | A1* | 5/2009 | Moussaeiff | G08G 1/096838 |
| | | | | 707/E17.014 |
| 2016/0298977 | A1* | 10/2016 | Newlin | G01C 21/3679 |
| 2020/0149903 | A1* | 5/2020 | Beaurepaire | G01C 21/3423 |
| 2021/0192420 | A1* | 6/2021 | Spielman | G06N 5/01 |
| 2021/0219257 | A1* | 7/2021 | Anand | H04W 4/40 |
| 2021/0302175 | A1* | 9/2021 | Pishdadian | G06Q 10/02 |
| 2021/0356288 | A1* | 11/2021 | Hajj | G01C 21/3492 |
| 2021/0407031 | A1* | 12/2021 | Gulati | G01C 21/3415 |
| 2022/0363161 | A1* | 11/2022 | Whitt | G08G 1/205 |
| 2024/0152995 | A1* | 5/2024 | Simpson | G06Q 30/08 |

* cited by examiner

SYSTEMS AND METHODS FOR PROVIDING MOBILITY SERVICES

CROSS-REFERENCE TO RELATED APPLICATION

This application claims priority to and the benefit of Korean Patent Application No. 10-2021-0115783 filed in the Korean Intellectual Property Office on Aug. 31, 2021, the entire contents of which are incorporated herein by reference.

TECHNICAL FIELD

The present disclosure relates to a system and method for providing a mobility service.

BACKGROUND

As used throughout this patent, the term "mobility" is intended to mean any type of moving vehicle, device, machine, instrument, apparatus, or the like. Recently, as interest in mobility services such as shared bicycles and shared electric kickboards has increased, shared transportation services have been actively provided. Existing transportation means, such as taxis, subways, and buses, and new transportation means, such as shared bicycles and shared electric kickboards, have different costs or charges. In addition, a user's preference for each transportation means (i.e., each type of mobility vehicle) is also different.

Accordingly, there is a limit in the quantity of integrated information that may be provided to a user on various transportation means. Therefore, there is a need for a service that can know an estimated cost when using one of various transportation means or a combination of various transportation means, and a transportation means recommendation service for recommending a transportation means according to a preference or experience for the transportation means for each user. In addition, there is a need for a system that guides a path that a user can use within a predetermined amount (i.e., within a predetermined budget or cost), rather than a system that provides a cost after finding the optimal transportation means or the combination of the transportation means.

The above information disclosed in this Background section is only to enhance understanding of the background of the disclosure. Therefore, the Background section may contain information that does not form the prior art that is already known in this country to a person of ordinary skill in the art.

SUMMARY

The task to be achieved by the present disclosure in order to solve the above problem is, in providing a mobility service that determines a transportation means available to a user, providing a service that matches a user's individual characteristics within a user's available amount (i.e., budget or cost constraints) for the user to conveniently decide on the transportation means.

In addition, the mobility service is guiding (i.e., providing) a path capable of being used by the user within a determined budget so as to increase predictability of using a taxi, a shared bicycle, or a shared electric kickboard, which has a large difference in price depending on the distance used.

The problems to be solved by the present disclosure are not limited to those mentioned above. Other problems not mentioned above should be clearly understood by a person of ordinary skill in the art from the description below.

A method of providing a mobility service according to an aspect of the present disclosure includes receiving a user's personal information and service request information from a user terminal and receiving transportation mode data from a traffic application programming interface (API) through a service providing terminal. The method further includes determining a plurality of transportation modes according to a preference of the transportation modes included in the service request information through the service providing terminal. The method also includes determining whether there is a first public transportation mode capable of moving from a departure point to a destination without a transfer through the service providing terminal if the plurality of transportation modes includes a public transportation mode. The method also includes determining whether a residual distance of a path through which the first public transportation mode moves exceeds a predetermined distance through the service providing terminal if there is a first public transportation mode capable of moving without transferring. The method further includes determining whether to use a combination of the first public transportation mode and a shared transportation mode among the plurality of transportation modes through the service providing terminal if the residual distance exceeds the predetermined distance.

The determining of whether to use the combination of the first public transportation mode and the shared transportation mode may include determining whether to use the shared transportation mode through the service providing terminal based on a comparison result of whether the estimated charge when moving from a departure point of the residual distance to a destination of the residual distance by the shared transportation mode is within a range of a second usable budget excluding the estimated charge when moving by the first public transportation mode from a first usable budget included in the service request information if there is a shared transportation mode parked in a local range within a predetermined distance based on the departure point of the residual distance.

When there is no first public transportation mode from the departure point to the destination without transferring, the method may include determining whether to move by a combination of a second public transportation mode and a third public transportation mode through the service providing terminal based on a comparison result of whether the estimated charge when moving from the departure point to the destination by a combination of the second public transportation mode and the third public transportation mode is within the range of the usable budget included in the service request information.

When there is no first public transportation mode from the departure point to the destination without transferring, the method may include determining whether to move by combining a second public transportation mode and a taxi mode through the service providing terminal based on a comparison result of whether the estimated charge when moving from the departure point to the destination by the combination of the second public transportation mode and the taxi mode is within the range of the usable budget included in the service request information.

The method may include determining to move by combining the first public transportation mode and walking through the service providing terminal if the residual distance is within the predetermined distance.

If the plurality of transportation modes includes a taxi mode, the method may include determining an estimated charge expected when moving from the departure point to the destination and determining whether to use the taxi mode based on a comparison result of whether the estimated charge is within the range of the usable budget included in the service request information through the service providing terminal.

If the plurality of transportation modes includes a shared transportation mode, the method may include determining whether to move using the shared transportation mode from the departure point to the destination based on a result of determining whether there is a shared transportation mode parked in a local range within a predetermined distance based on the departure point through the service providing terminal.

The determining of whether to move using the shared transportation mode may include, if there is a shared transportation mode parked in a local range within a predetermined distance based on the departure point, determining an estimated charge expected when moving using the shared transportation mode from the departure point to the destination. The method may further include determining whether to use the shared transportation mode based on a comparison result of whether the estimated charge is within the range of the usable budget included in the service request information through the service providing terminal.

A mobility service providing system according to an aspect of the present disclosure includes a service providing terminal determining a plurality of transportation modes according to a preference of the transportation modes included in service request information received from a user terminal and determining a transportation mode to be used among the plurality of transportation modes to provide a movement path using the transportation modes through an application. The system also includes a traffic API transmitting transportation mode data including an estimated charge for each transportation mode to the service providing terminal according to a request of the service providing terminal.

The service providing terminal may include a priority determining module receiving a user's personal information and service request information from the user terminal and receiving transportation mode data from the traffic API to determine the plurality of transportation modes according to a preference of the transportation modes included in the service request information. The service providing terminal may also include a usage determining module creating a signal to be transmitted to the priority determining module by determining whether to use each transportation mode included in the plurality of transportation modes when moving from a departure point to a destination if a signal is received from the priority determining module.

The usage determining module may include a taxi module for determining whether to use a taxi mode from the departure point to the destination if the plurality of transportation modes include a taxi mode. The usage determining module may also include a public transportation module for determining whether to use a public transportation mode from the departure point to the destination if the plurality of transportation modes include a public transportation mode. The usage determining module may also include a walking module for determining whether to move from the departure point to the destination by walking if the plurality of transportation modes include walking. The usage determining module may further include a shared transportation module for determining whether to use a shared transportation mode from the departure point to the destination if the plurality of transportation modes include a shared transportation mode.

The public transportation module may determine whether there is a first public transportation mode that can move without transferring when moving from the departure point to the destination by the public transportation if the plurality of transportation modes include the public transportation mode. The public transportation module may also determine whether to use the first public transportation mode based on a result of determining whether the residual distance of the path through which the first public transportation mode travel distance exceeds a predetermined distance if there is a first public transportation mode that may move without the transferring.

The public transportation module may determine whether there is a first public transportation mode that can move without transferring when moving from the departure point to the destination by a public transportation. If the plurality of transportation modes include the public transportation mode, when there is no first public transportation mode to move without transfer, the public transportation module may determine whether to use the first transportation mode based on a result of determining whether to move by combining a second public transportation mode and a third public transportation mode based on a comparison result of whether an estimated charge when moving by the combination of the second public transportation mode and the third public transportation mode from the departure point to the destination is within a range of a usable budget Included in the service request information.

The public transportation module may determine whether there is a first public transportation mode that can move without a transferring when moving from the departure point to the destination by the public transportation if the plurality of transportation modes include the public transportation modes. The public transportation module may determine whether to use the first public transportation mode based on a result determining whether to move by combining a second public transportation mode and a taxi mode based on a comparison result of whether an estimated charge when moving by the combination of the second public transportation mode and the taxi mode from the departure point to the destination is within a range of a usable budget included in the service request information when there is no first public transportation mode to travel without transferring.

The shared transportation module may determine whether to use a shared transportation mode based on a result of determining whether there is a shared transportation mode parked in a local range within a predetermined distance based on the departure point if the plurality of transportation modes include the shared transportation mode.

The shared transportation module may determine an estimated charge expected when moving from the departure point to the destination by using the shared transportation mode if there is a shared transportation mode parked in a local range within a predetermined distance based on the departure point. The shared transportation module may determine whether to use the shared transportation mode based on a comparison result of whether the estimated charge is within the range of the usable budget included in the service request information.

The walking module may determine whether to move by combining walking and a shared transportation mode based on a result of determining whether to use the shared transportation mode if a walking distance from the departure point to the destination is within a predetermined range when the plurality of transportation modes include walking.

The present disclosure provides a mobility service in which the user decides the means (i.e., mode) of transportation. The present disclosure determines the transportation means that can be used within the usable budget of the user. The present disclosure may consider the user's preference and the history of previous usage to determine the transportation means. In this way, the user may conveniently use the transportation means by determining the transportation means corresponding to the user's personal characteristics.

The effect of the present disclosure is not limited to those effects mentioned above, Other effects not mentioned should be clearly understood by a person of ordinary skill in the art from the description below.

DETAILED DESCRIPTION OF THE EMBODIMENTS

Figure 1:
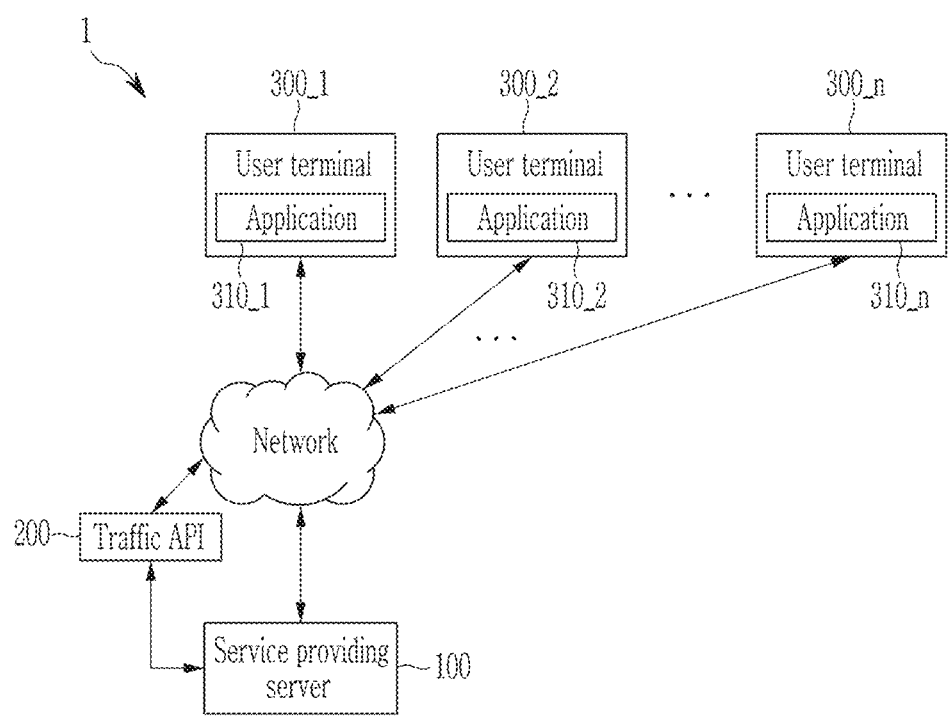
FIG. 1 is a block diagram for explaining a mobility service providing system according to an embodiment.

The present disclosure relates to a method and system for providing a mobility service that determines a transportation means (i.e., a transportation mode) according to an amount limit (i.e., a cost or a budget), and relates to a method and system that can provide a moving method by referring to a preference for a transportation means of a user, a history of a previous use of the transportation means, and the like as well as a usable budget of the user.

Hereinafter, embodiments disclosed in the present specification are described in detail with reference to the accompanying drawings. In the present specification, the same or similar constituent elements are denoted by the same or similar reference numerals, and an overlapped (e.g., duplicative) description thereof has been omitted. The terms "module" and "unit" for components used in the following description are used only in order to easily describe the inventive concept. Therefore, these terms do not have meanings or roles that distinguish them from each other in themselves. Further, in describing embodiments of the present specification, where it is determined that a detailed description of the well-known art associated with the present disclosure may obscure the gist of the present inventive concept, a detailed description of the well know art has been omitted. In addition, the accompanying drawings are provided only in order to allow embodiments disclosed in the present specification to be easily understood and are not to be interpreted as limiting the spirit disclosed in the present specification. It should be understood that the present disclosure includes all modifications, equivalents, and substitutions without departing from the scope and spirit of the present inventive concept.

Terms including ordinal numbers such as first, second, and the like are used only to describe or distinguish among various components and are not to be interpreted as limiting these components. The terms are only used to differentiate one component from other components.

It should be further understood that the terms "comprise" or "have" used in the present specification specify the presence of stated features, numerals, steps, operations, components, parts, or a combination thereof. Such terms do not preclude the presence or addition of one or more other features, numerals, steps, operations, components, parts, or a combination thereof.

In a configuration for controlling other configurations, in a specific control condition among configurations according to an embodiment, a program may be installed that is implemented as a set of instruction words embodying a control algorithm necessary to control other configurations. The control configuration may generate output data by processing input data and stored data according to the installed program. The control configuration may include a non-volatile memory to store the programs and a memory to store the data.

FIG. 1 is a block diagram for explaining a mobility service providing system according to an embodiment.

Referring to FIG. 1, a mobility service providing system 1 according to an embodiment may include a service providing terminal 100, a traffic application programming interface (API) 200, and a plurality of user terminals 300_1 to 300_n, Each configuration is connected to each other through a network. The service providing terminal 100 and the traffic API 200 may be connected by a network or directly connected.

The traffic API 200 may be a platform provided to use data stored in a server managing in an intelligent transportation system (ITS). The traffic API 200 may include a module that can provide public data on an intelligent traffic infrastructure. The public data may include local basic information such as location information, land usage information, characteristic information, infrastructure information, a parking facility status, signal data, a traffic accident status, public traffic facility information, shared transportation means facility status information, and road traffic information such as road sections, intersection information, road type information, and the like.

Also, a plurality of applications 310_1 to 310_n is installed on a plurality of user terminals 300_1 to 300_n, respectively. Hereinafter, when common operation and technical characteristics of a plurality of user terminals 300_1 to 300_n are described, it may be referred to as a user terminal 300. When describing common operation and technical characteristics of a plurality of applications 310_1 to 310_n, it may be referred to as an application 310.

The transportation means (i.e., transportation mode) is a traffic means (i.e., traffic mode) available to the general public, and may include walking, a shared bicycle, a shared electric kickboard, a taxi, a bus, a subway, a train, and the like. Hereinafter, when describing operation and technical characteristics of the shared bicycle, it may be referred to as a bicycle. When describing motion and technical characteristics of the shared electric kickboard, it may be referred to as a kickboard.

The service providing terminal 100 provides a mobility service through the application 310 by using data received from the traffic API 200 and the user terminal 300. The mobility service is a service that determines a transportation means within the usable amount cost, budget) range by using the received data. The mobility service may include a service that provides information on transportation means, such as a current position of the transportation means and an estimated charge (i.e., cost).

The service providing terminal 100 determines a plurality of transportation means (i.e., a plurality of transportation modes) and determines a transportation means to be used among the plurality of transportation means according to the transportation means preference included in the service request information received from the user terminal 300. Thus, a movement path using the transportation means is provided through the application 310.

Figure 2:
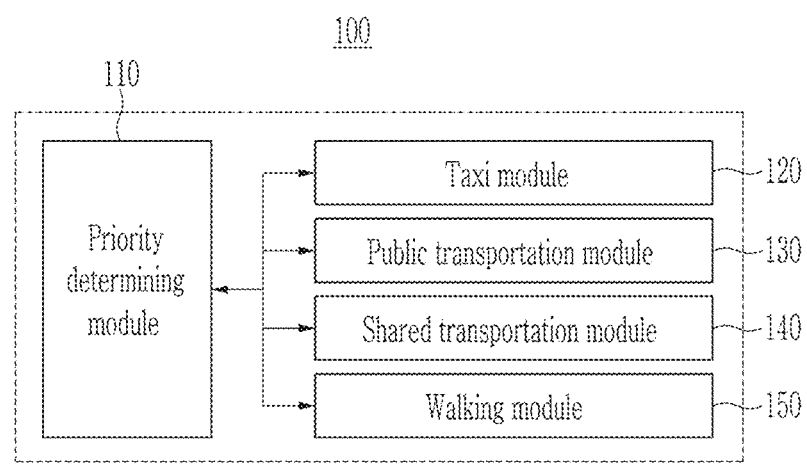
FIG. 2 is a block diagram for explaining a service providing terminal of FIG. 1.

FIG. 2 is a block diagram to explain a service providing terminal of FIG. 1.

Referring to FIG. 2, the service providing terminal 100 may include a priority determining module 110, a taxi module 120, a public transportation module 130, a shared transportation module 140, and a walking module 150. Hereinafter, when describing common operation and technical characteristics of the taxi module 120, the public transportation module 130, the shared transportation module 140, and the walking module 150, it may be referred to as a usage determining module 160.

The priority determining module 110 may receive a user's personal information and service request information from the user terminal 300, receive transportation means data (i.e., transportation mode data) from the traffic API 200, and determine a plurality of transportation means according to the transportation means preference included in the service request information.

If a signal is received from the priority determining module 110, the usage determining module 160 may generate a signal by determining whether to use each transportation means included in a plurality of transportation means when moving from the departure point to the destination and may transmit the signal to the priority determining module 110.

The taxi module 120 is a module that determines whether to use a taxi means (i.e., a taxi mode) from the departure point to the destination when a plurality of transportation means include a taxi means. The public transportation module 130 is a module that determines whether to use the public transportation means (i.e., a public transportation mode) from the departure point to the destination when a plurality of transportation means include the public transportation means. The public transportation may include a bus and a subway, for example. The shared transportation module 140 is a module that determines whether to use the shared transportation means (i.e., shared transportation mode) from the departure point to the destination, if a plurality of transportation means include the shared transportation means. The shared transportation means may include a bicycle and a kickboard, for example. The walking module 150 is a module that determines whether to move by walking.

Figure 3:
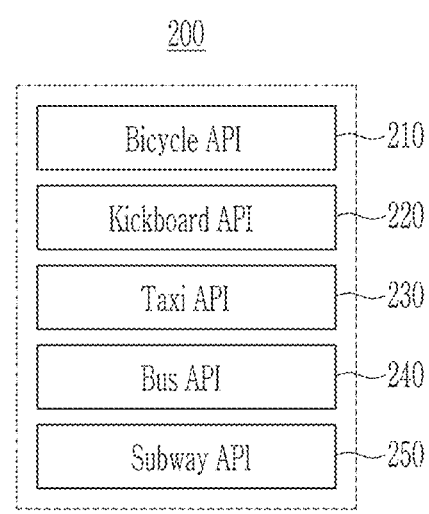
FIG. 3 is a block diagram to explain a traffic application programming interface (API) of FIG. 1.

FIG. 3 is a block diagram to explain a traffic API of FIG. 1.

The traffic API 200 transmits the transportation means data to the service providing terminal 100 according to the request of the service providing terminal 100, Referring to FIG. 3, the traffic API 200 may include a bicycle API 210, a kickboard API 220, a taxi API 230, a bus API 240, and a subway API 250. The transportation means data may include an estimated charge for each transportation means, a current position of the transportation means, and a required time for the usage. Each of the bicycle API 210, the kickboard API 220, the taxi API 230, the bus API 240, and the subway API 250 may receive the transportation means data from a server managing the corresponding transportation means. When the corresponding API does not receive some data among the transportation means data, the service providing terminal 100 may create the corresponding data.

Figure 4:
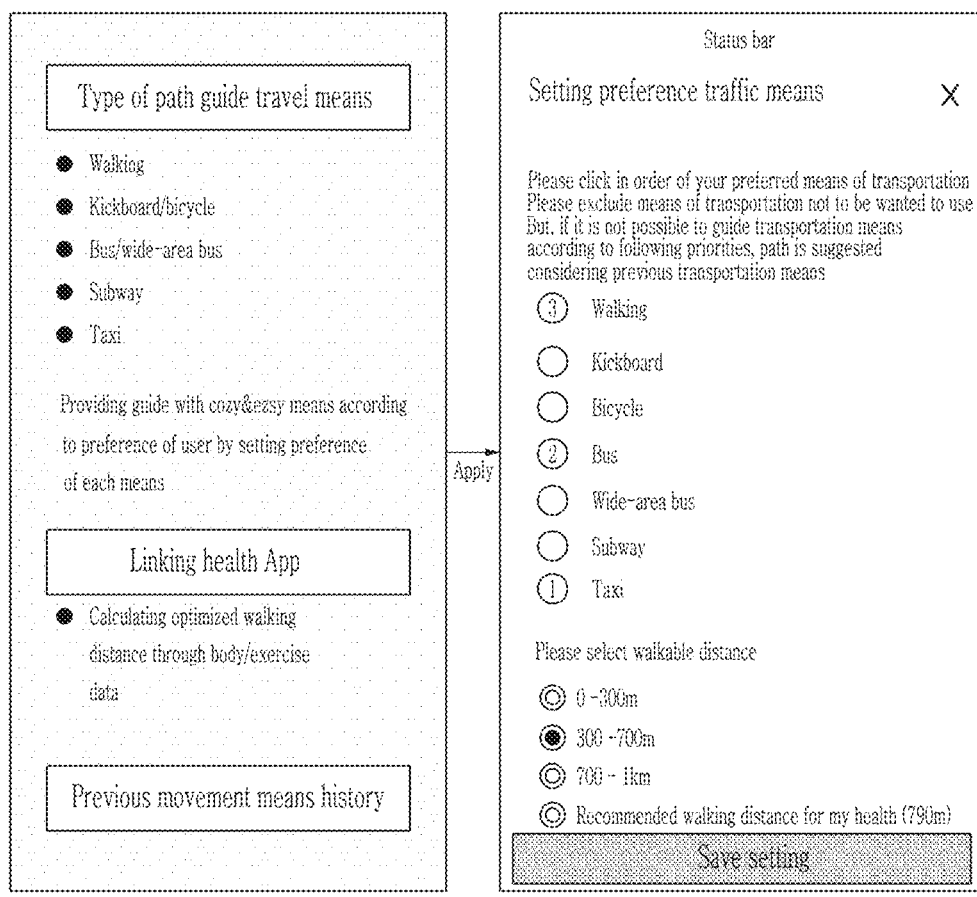
FIG. 4 is a view showing a screen provided through an application of a user terminal according to a mobility service according to an embodiment.

FIG. 4 is a screen provided through an application of a user terminal according to a mobility service according to an embodiment.

In FIG. 4, the user's preference for the transportation means received through the application 310 is in the order of the taxi, the bus, and walking. The application 310 may receive a walking distance as an input.

Figure 5:
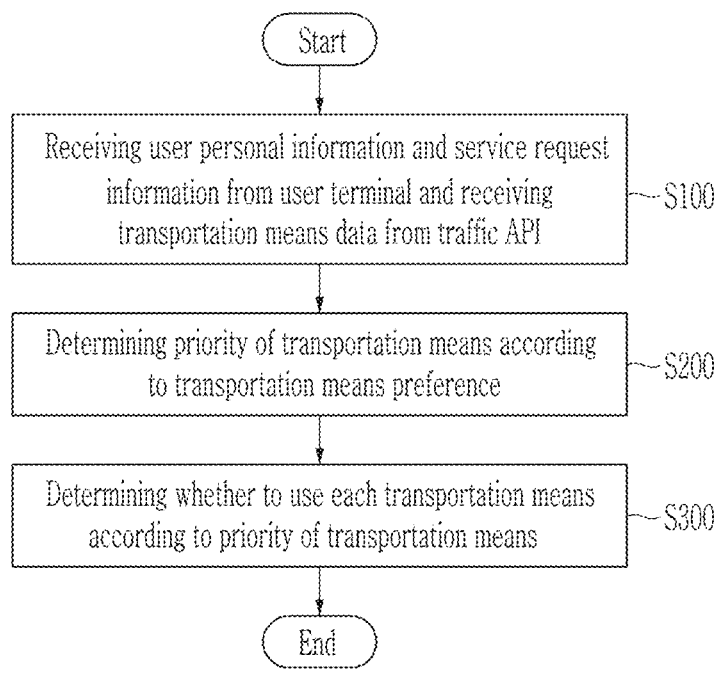
FIG. 5 is a flowchart for explaining a mobility service providing method according to an embodiment.

FIG. 5 is a flowchart to explain a mobility service providing method according to an embodiment.

In the mobility service providing method according to an embodiment, the service providing terminal 100, the traffic API 200, and the user terminal 300 operate by exchanging the data with each other.

The service providing terminal 100 receives the user personal information and the service request information from the user terminal 300 and receives the transportation means data from the traffic API 200 (S100). The service providing terminal 100 determines the priority of the transportation means according to the received transportation means preference (S200). The service providing terminal 100 determines whether to use each transportation means according to the priority of the transportation means (S300).

In the step (S100), the service providing terminal 100 may receive the user personal information from the user terminal 300, The user personal information may include health information, a history of a previous usage of the transportation means, a frequency of the previous usage of the transportation means, and the like. The health information may include the number of steps required per day of the user stored in the user terminal, the number of a current day steps, and the like. Here, the number of steps required per day, the number of a current day steps, the history of previous use of the transportation means, and the frequency of previous usage of the transportation means may be collected from the application 310 itself. Also, the number of steps required per day, the number of current day steps (i.e. the number of steps taken in the current day), the history of the previous usage of the transportation means, the frequency of the previous usage of the transportation means, and the like may be collected in another application linked to the application 310.

In the step (S100), the service providing terminal 100 may receive the service request information from the user terminal 300. At this time, the service request information may include the departure point, the destination, the usable budget or cost, the preference of transportation means, and the like input by the user to use the mobility service.

The usable budget or cost may be limited to be a value greater than or equal to a predetermined minimum value. At this time, the predetermined minimum value may be determined based on the usage amount of the public traffic.

In the step (S100), the service providing terminal 100 may receive the transportation means data from the traffic API 200. The transportation means data may include the estimated charge for each transportation means, the current position of the transportation means, and the required time for the usage.

In the following, the steps (S200) and (S300) of FIG. 5 are described focusing on the signals exchanged by each of the modules 110-150 of FIG. 2.

The service providing terminal 100 may provide a service for a plurality of transportation means among the available transportation means (i.e., all of the transportation means). Hereinafter, the available transportation means includes walking, the bicycle, the electric kickboard, the taxi, the bus, the subway, the long distance bus, the train, and the like. A plurality of transportation means includes transportation means whose priority is selected through the user terminal 300 among the available transportation means.

The priority determining module 110 may determine a plurality of transportation means according to the preference of the transportation means. Here, the preference for transportation means may be input through the user terminal 300. Alternatively, the preference of the transportation means may be created in the user terminal 300 based on the history of the previous usage of the user's transportation means.

The priority determining module 110 determines the priority of a plurality of transportation means according to the preference of the transportation means (S200). The preference of the transportation means may be included in the service request information received from the user terminal 300. The priority determining module 110 may determine the priority among a plurality of transportation means among the entire transportation means according to the preference of the transportation means of the user. For example, it may be assumed that, among the preference of the transportation means of the user, the first priority is the taxi, the second priority is the subway, the third priority is the kickboard, and the fourth priority is walking. The priority determining module 110 determines the taxi, the subway, the kickboard, and walking among the available transportation means as a plurality of transportation means. The priority determining module 110 determines the priority one to four of a plurality of transportation means in the order of the taxi, the subway, the kickboard, and the walking.

The priority determining module 110 determines whether to use a plurality of transportation means according to the priority of a plurality of transportation means through the usage determining module 160 (S300). The priority determining module 110 may transmit a usage determination request signal to each of the usage determining module 160 for a plurality of transportation means. Alternatively, the priority determining module 110 may transmit the usage determining request signal to the usage determining module 160 of a plurality of transportation means in the order of the priority. The usage determining request signal may include a signal indicating the departure point and the destination. In addition, the usage determining request signal may include a signal indicating the usable budget amount.

Upon receiving the usage determining request signal, the usage determining module 160 determines whether to use the transportation means and transmits a usable determining signal or an unusable determining signal to the priority determining module 110. The usable determining signal may include information on the transportation means. The information of the transportation means may include a movement path, an estimated charge, and an estimated required time when using the transportation means.

Hereinafter, the estimated charge is a charge expected to be charged when using the corresponding transportation means. The estimated charge may be calculated in the usage determining module 160 in consideration of the transportation means data received from the traffic API 200 and the estimated distance of the moving path.

The priority determining module 110 may receive the usable determining signal or the unusable determining signal from the usage determining module 160. The priority determining module 110 may receive the movement path together with the usable determining signal. The movement path is a path generated by the usage determining module 160. Thereafter, the priority determining module 110 may provide at least one movement path through the application 310. The priority determining module 110 may provide information of at least one transportation means through the application 310. If there is no usable determining signal among the signals received from the usage determining module 160 of a plurality of transportation means, the priority determining module 110 may provide an unusable message through the application 310.

Here, the usable determining signal may include at least one transportation means usable determining signal received from any one of the taxi module 120, the public transportation module 130, the shared transportation module 140, and the walking module 150. At least one transportation means usable determining signal may include a transfer determination signal using a combination of two or more transportation means.

The public transportation module 130 may determine whether to transfer by one of other transportation means. In this case, the other transportation means may be one of the transportation means and the public transportation having a higher priority than the public transportation. In this case, the transportation means having a higher priority than the public transportation may be a taxi. Hereinafter, a case of transferring to any one of other transportation means while using the public transportation is described.

The priority determining module 110 may receive a transfer request signal from the public transportation module 130. The transfer request signal may include a signal indicating the departure point and the destination of the residual distance.

When the transfer request signal is received, the priority determining module 110 determines whether to sequentially use the priority for other transportation means. The priority determining module 110 may transmit a transfer determining request signal in the order of the priority to the usage determining module 160 for other transportation means. Here, the transfer determining request signal may include a signal indicating the departure point and the destination of the residual distance.

Upon receiving the transfer determining request signal, the usage determining module 160 determines whether the estimated charge is within the usable budget when transferring to each transportation means. The usage determining module 160 may calculate the estimated charge based on a unit fee for each transportation means, a movement distance, a traffic situation, and the like. The usage determining module 160 transmits a transferable signal to the priority determining module 110 if the estimated charge is within the usable budget when transferring. The usage determining module 160 transmits a non-transferable signal to the priority determining module 110 if the estimated charge is not within the usable budget or cost when transferring. Alternatively, the usage determining module 160 may directly transmit the transferable signal or the non-transferable signal to the public transportation module 130. Here, the estimated charge may be calculated based on the fare expected to be charged when moving from the departure point to the destination in a combination of the public traffic and other transportation means. In this case, the usable budget may be an amount included in the received service request information.

In addition, the public transportation module 130 may use the shared transportation means together with the public transportation means. In addition, the walking module 150 may use the shared transportation means together with walking. Hereinafter, a case of using the shared transportation means while using the public transportation or walking is described.

The public transportation module 130 may transmit a shared transportation means determining request signal to the priority determining module 110. The walking module 150 may transmit a shared transportation means determining request signal to the priority determining module 110. The priority determining module 110 receiving the shared transportation means determining request signal may transmit the usage determining request signal to the shared transportation module 140. The priority determining module 110 may receive the usable determining signal or the unusable determining signal from the shared transportation module 140. The priority determining module 110 may transmit the usable determining signal or the unusable determining signal to the module that has transmitted the shared transportation means determining request signal among the public transportation module 130 and the walking module 150.

Figure 6:
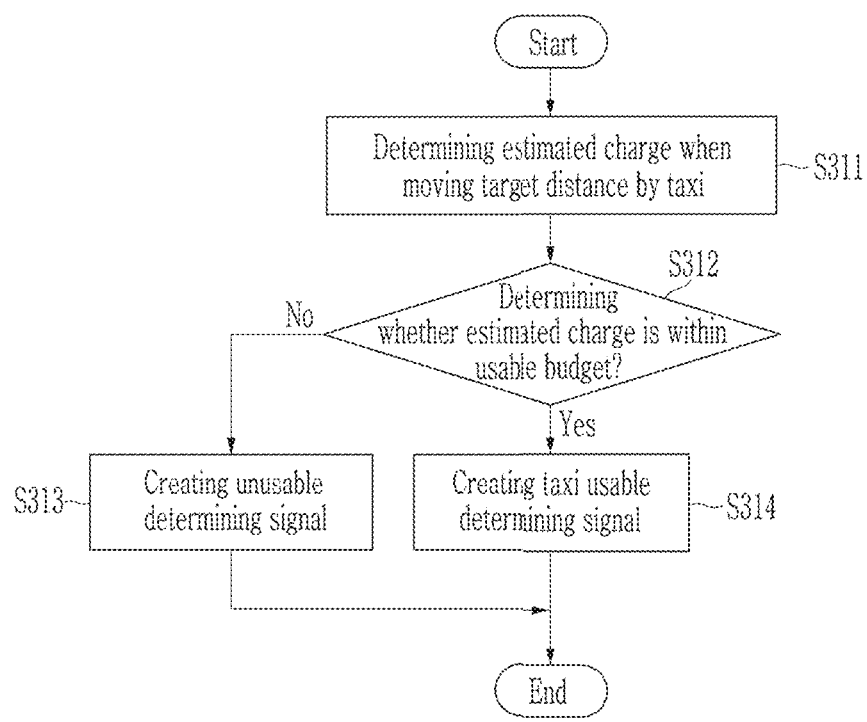
FIG. 6 is a detailed flowchart when using a taxi in a step of deciding whether to use a transportation means in FIG. 5.

FIG. 6 is a detailed flowchart when using a taxi in a step of deciding whether to use a transportation means in FIG. 5.

When the usage determining request signal is received from the priority determining module 110, the taxi module 120 determines the estimated charge when moving the target distance by the taxi (S311). The target distance is the distance traveled by taxi from the departure point to the destination. Here, the departure point and the destination may be included in the signal received from the priority determining module 110.

The taxi module 120 may collect taxi fare information from the taxi API 230. The taxi fare information collected from the taxi API 230 may include fare information such as a basic fare and an additional charge compared to the distance when moving by the taxi. The fare information may include incentive information such as a fare discount according to the permission of taxi occupants to ride together. The taxi module 120 may determine the estimated charge when moving by the taxi based on the target distance and the taxi fare information. In determining the estimated charge, the taxi module 120 may consider the fare discount due to the permission of the taxi occupants to ride together.

The taxi module 120 determines whether the estimated charge is within the usable budget (S312). The usable budget amount may be an amount included in the usable determining signal. Alternatively, the usable budget amount may be an amount within an error range of the amount included in the usable determining signal. Here, the error range may be set through user input information input through the user terminal 300. When the estimated charge exceeds the usable budget amount, the taxi module 120 may determine whether the estimated charge determined under the condition that a discount is provided due to the permission of the taxi occupants to ride together is within the usable budget.

If the estimated charge is not within the usable budget, the taxi module 120 creates the unusable determining signal (S313). The taxi module 120 creates the unusable determining signal and transmits it to the priority determining module 110.

If the estimated charge is within the usable budget, the taxi usable determining signal is created (S314). The taxi module 120 creates the taxi usable determining signal and transmits it to the priority determining module 110.

In other words, if a plurality of transportation means includes the taxi means, the taxi module 120 determines the estimated charge expected when moving from the departure point to the destination and may determine whether to use the taxi means based on the comparison result of whether this estimated charge is within the range of the usable budget included in the service request information.

Figure 7:
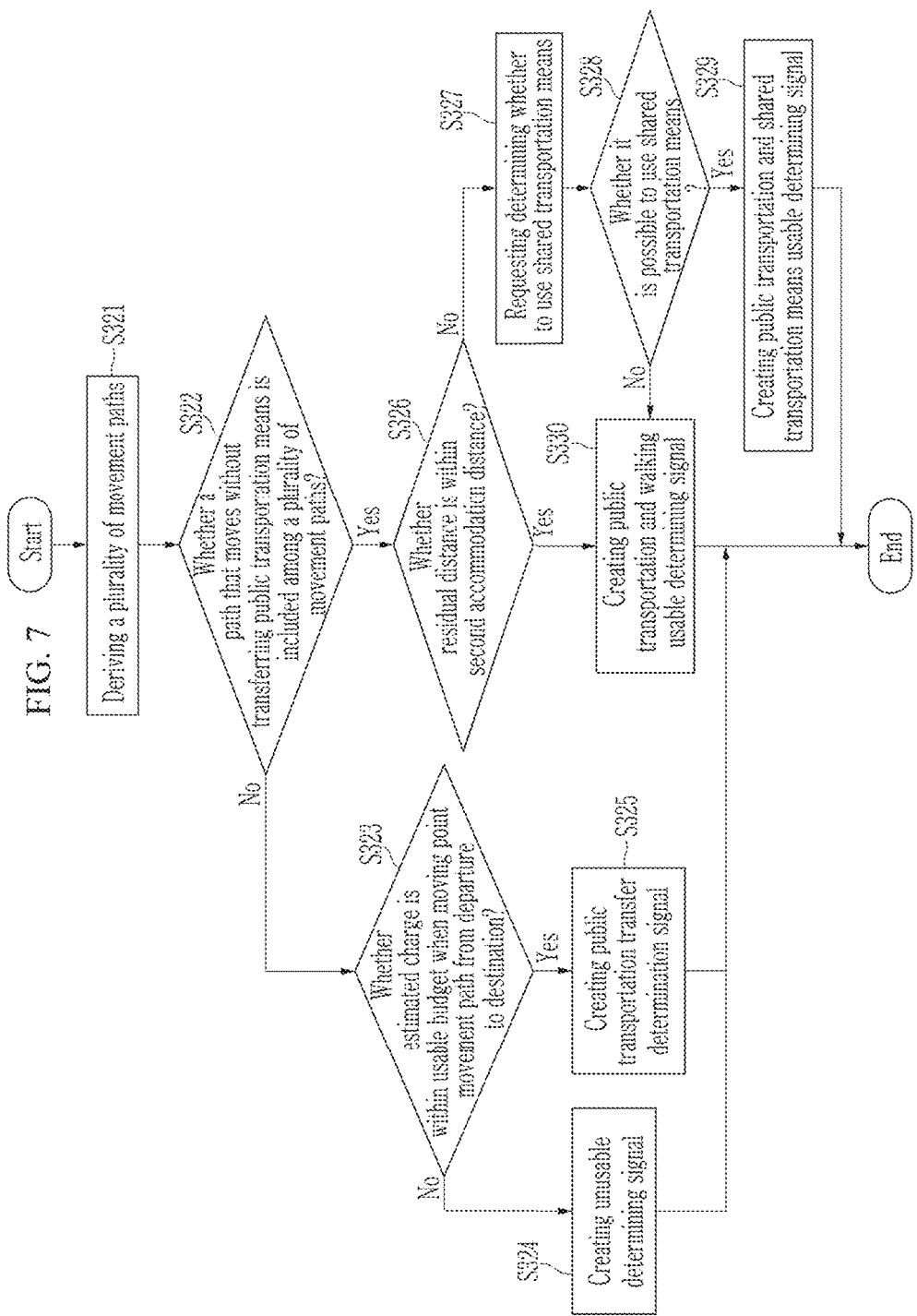
FIG. 7 is a detailed flowchart when using a public transportation in a step of deciding whether to use a transportation means of FIG. 5.

FIG. 7 is a detailed flowchart when using public transportation in a step of deciding whether to use a transportation means of FIG. 5.

Upon receiving the usage determining request signal from the priority determining module 110, the public transportation module 130 derives a plurality of movement paths (S321). The plurality of movement paths are paths for moving from the departure point to the destination by the public transportation. A plurality of movement paths are paths that may be used to move by using any one of the public transportations means from a stop of the public transportation included in a regional range within a predetermined distance based on the departure point to a stop of the public transportation included in a regional range within a predetermined distance based on the destination.

The public transportation module 130 determines whether a path that is used to move without transferring the public transportation means is included among a plurality of movement paths (S322). A path that is used to move without transferring the public transportation means is a path whose residual distance is within a first accommodation distance. The residual distance may be a distance obtained by adding the walking distance from the departure point to the boarding stop and the walking distance from the getting-off stop to the destination. The first accommodation distance is a minimum value of the walking distance that the user may accommodate when using one public transportation unit without transferring. The first accommodation distance may be set through the user input information input through the user terminal 300. For example, the first accommodation distance may be set to 500 m.

If there is no path that can be used to move without transferring the public transportation means among a plurality of movement paths, the public transportation module 130 determines whether the estimated charge is within the usable budget when using the movement path from the departure point to the destination by a combination of the public transportation means and other transportation means (hereinafter, referred to as the transfer movement) (S323). The public transportation module 130 transmits the transfer request signal to the priority determining module 110. The priority determining module 110 may transmit the transfer determining request signal to the usage determining module 160 for any one of other transportation means in the order of the priority.

The usage determining module 160 receiving the transfer determining request signal determines whether the estimated charge of the transfer movement is within the usable budget. Here, another transportation means may be public transportation. If the other transportation means is the public transportation, the public transportation module 130 determines whether the estimated charge of the transfer movement is within the usable budget in a combination of the first public transportation and the second public transportation. The first public transportation and the second public transportation may be the same transportation means. For example, the first public transportation and the second public transportation may be different routes of a bus, two buses, or the like. Alternatively, the first public transportation and the second public transportation may be other transportation means.

For example, the first public transportation may be the bus, and the second public transportation may be the subway. Here, whether it is within the usable budget may be determined based on the comparison result of whether the estimated charge expected when moving from the departure point to the destination in a combination of first public transportation and second public transportation is within the range of the usable budget.

Alternatively, another transportation means may be the taxi. Here, if the other transportation means is the taxi, whether it is within the usable budget may be determined based on the comparison result of whether the estimated charge expected when moving from the departure point to the destination by the combination of the first public transportation means and the taxi means is within the range of the usable budget.

If the estimated charge of transfer movement is within the usable budget, the usage determining module 160 transmits the transferable signal to the priority determining module 110. If the estimated charge of the transfer movement is not within the usable budget, the usage determining module 160 transmits the non-transferable signal to the priority determining module 110. The transferable signal may include the information on the transportation means. The information of the transportation means may include a movement path, an estimated charge, and an estimated required time when using the transportation means.

When the non-transferable signal is received, the public transportation module 130 creates the unusable determining signal (S324) and transmits it to the priority determining module 110.

Upon receiving the transferable signal, the public transportation module 130 creates the public transportation transfer determination signal (S325) and transmits it to the priority determining module 110.

If there is a path that is used to move without transferring the public transportation means among a plurality of movement paths, the public transportation module 130 determines whether the residual distance of the path that is used to move without transferring the public transportation means is within a second accommodation distance (S326). The second accommodation distance is a minimum value of a distance that may accommodate the user to move by the walking. The second accommodation distance may be set through the user input information input through the user terminal 300. Alternatively, the second accommodation distance may be a walking distance determined by the service providing terminal 100. The walking distance determined by the service providing terminal 100 may be calculated from the current required number of steps and provided through the application 310. The walking distance determined by the service providing terminal 100 may determine the current required number of steps by considering the number of steps required per day and the number of a current day steps of the user included in the health information received from the user terminal 300. In the example of FIG. 4, the second accommodation distance is set to 300-700 m, and the walking distance determined by the service providing terminal 100 is 790 m.

If the residual distance is not within the second accommodation distance, the public transportation module 130 transmits the shared transportation means determining request signal to the priority determining module 110 (S327). Here, the shared transportation means request signal may include a signal indicating the departure point and the destination of the residual distance. In addition, the shared transportation means request signal may include a signal indicating the usable budget. Here, the usable budget or cost may be an amount excluding the estimated charge of the path that is used to move without transferring the public transportation means from the usable budget amount included in the service request information.

Upon receiving the shared transportation means request signal, the priority determining module 110 may transmit the usage determining request signal to the shared transportation module 140. Here, the usage determining request signal may include a signal indicating the departure point and the destination of the residual distance and the usable budget. Upon receiving the usage determining request signal, the shared transportation module 140 determines whether the shared transportation means may be used (S328).

Upon receiving the usable determining signal from the shared transportation module 140, the priority determining module 110 transmits the usable determining signal to the public transportation module 130. Upon receiving the usable determining signal, the public transportation module 130 creates a public transportation and shared transportation means usable determining signal (S329) and transmits it to the priority determining module 110.

Upon receiving the unusable determining signal from the shared transportation module 140, the priority determining module 110 transmits the unusable signal to the public transportation module 130. Upon receiving the unavailable signal, the public transportation module 130 creates the public transportation and walking usable determining signal (S330) and transmits it to the priority determining module 110.

If the residual distance is within the second accommodation distance, the public transportation module 130 creates the public transportation and walking usable determining signal (S330) and transmits it to the priority determining module 110.

In other words, if a plurality of transportation means includes the public transportation means, the public transportation module 130 determines whether there is a first public transportation means that can move from the departure point to the destination without the transferring. In addition, if there is the first public transportation means that can move without the transferring, it is determined whether the residual distance of the path through which the first public transportation means moves exceeds a predetermined distance. In addition, if the residual distance exceeds the predetermined distance, the service providing terminal determines whether to use the shared transportation means among a plurality of transportation means.

Figure 8:
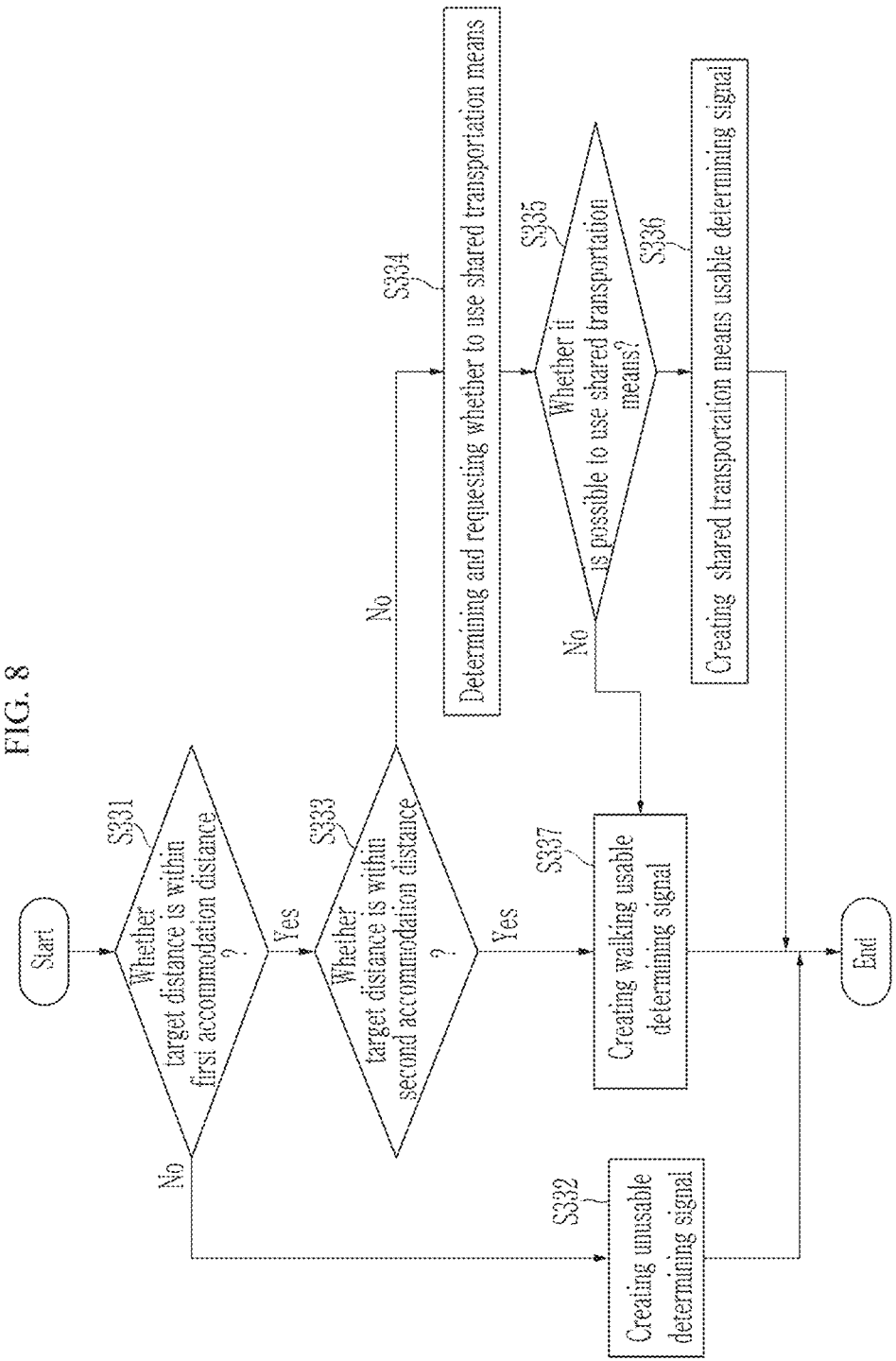
FIG. 8 is a detailed flowchart when using walking in a step of determining whether to use a transportation means in FIG. 5.

FIG. 8 is a detailed flowchart when using walking in a step of determining whether to use a transportation means in FIG. 5.

If the usage determining request signal is received from the priority determining module 110, the walking module 150 determines whether the target distance is within the first accommodation distance (S331). The target distance is a distance from the departure point to the destination by walking. If the target distance is not within the first accommodation distance, the walking module 150 creates the unusable determining signal (S332) and transmits it to the priority determining module 110.

If the target distance is within the first accommodation distance, the walking module 150 determines whether the target distance is within the second accommodation distance (S333). If the target distance is not within the second accommodation distance, the walking module 150 transmits the shared transportation means determining request signal to the priority determining module 110 (S334). Here, the shared transportation means request signal may include a signal indicating the departure point and destination of the residual distance. In addition, the shared transportation means request signal may include a signal indicating the usable budget. Here, the usable budget may be a usable amount included in the service request information. Upon receiving the shared transportation means request signal, the priority determining module 110 may transmit the usage determining request signal to the shared transportation module 140. Here, the usage determining request signal may include a signal indicating the departure point and the destination of the target distance. Upon receiving the shared transportation means request signal, the shared transportation module 140 determines whether it is possible to use the shared transportation means (S335).

If the shared transportation means is available, the shared transportation module 140 may create the shared transportation means usable determining signal (S336) and transmit it to the priority determining module 110. Alternatively, the priority determining module 110 transmits the usable determining signal to the walking module 150 upon receiving the usable determining signal from the shared transportation module 140. Upon receiving the usable determining signal, the walking module 150 may create the shared transportation means usable determining signal (S336) and transmit it to the priority determining module 110.

Upon receiving the unusable determining signal from the shared transportation module 140, the priority determining module 110 transmits the unusable signal to the walking module 150. Upon receiving the unusable signal, the walking module 150 may create a walking usable determining signal (S337) and transmit it to the priority determining module 110.

Figure 9:
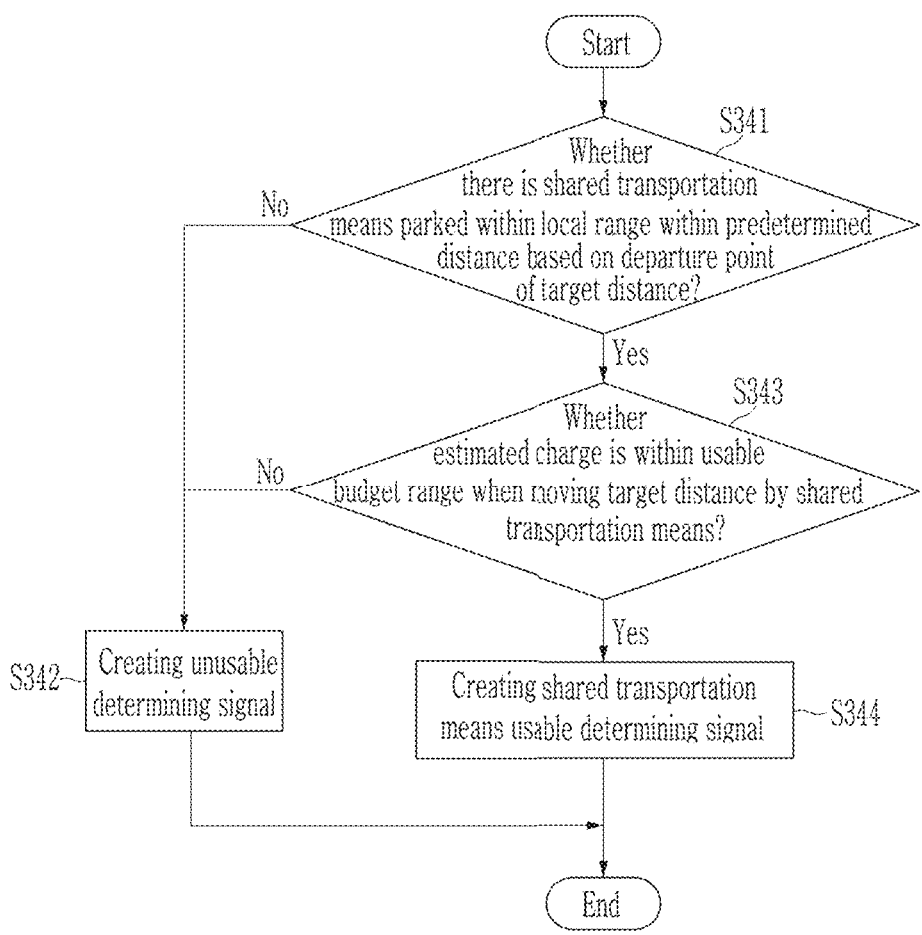
FIG. 9 is a detailed flowchart when using a shared transportation means in a step of deciding whether to use a transportation means in FIG. 5.

FIG. 9 is a detailed flowchart when using a shared transportation means in a step of deciding whether to use a transportation means in FIG. 5.

Upon receiving the usage determining request signal from the priority determining module 110, the shared transportation module 140 determines whether there is the shared transportation means parked within a local range within a predetermined distance based on the departure point of the target distance (S341). The target distance is the distance from the departure point to the destination by shared transportation means Here, the departure point and destination may be included in a signal received from the priority determining module 110. The predetermined distance may be set through the user input information input through the user terminal 300.

Whether there is a parked shared transportation means may be determined by whether the shared transportation means is parked at least at a minimum parking number. The minimum parking number of the shared transportation means may be set through the user input information input through the user terminal 300, For example, it may be determined whether three kickboards are parked within a distance of 100 m from the departure point. The shared transportation module 140 may collect parking information of the bicycle and/or the kickboard from a bicycle API 210 and/or a kickboard API 220. The parking information of the bicycle and/or kickboard collected from the bicycle API 210 and/or the kickboard API 220 may include position information in which the shared transportation means is parked at a specific point in time. Here, the specific point in time may be an arbitrary point in the period from the time point when the usable determining signal is received from the priority determining module 110 to the time point when it is determined whether there is a parked shared transportation means.

If there is no shared transportation means in the local range within a predetermined distance based on the departure point of the target distance, the shared transportation module 140 creates the unusable determining signal (S342) and transmits it to the priority determining module 110.

If there is a shared transportation means in a local range within a predetermined distance based on the departure point of the target distance, the shared transportation module 140 determines whether the estimated charge is within the usable budget range when moving the target distance by the shared transportation means (S343). The shared transportation module 140 may collect fee information of the bicycle and/or the kickboard from the bicycle API 210 and/or the kickboard API 220. The fee information collected from the bicycle API 210 and/or the kickboard API 220 may include fee information such as an additional fee compared to a basic fee and distance when moving by the bicycle and/or the kickboard. The estimated charge may be determined based on a target distance and fee information.

If the estimated charge is not within the usable budget range, the shared transportation module 140 creates the unusable determining signal (S342) and transmits it to the priority determining module 110.

If the estimated charge is within the usable budget range, the shared transportation module 140 creates the shared transportation means usable determining signal (S344) and transmits it to the priority determining module 110.

In other words, if a plurality of transportation means includes the shared transportation means, the shared transportation module 140 may determine whether to use the shared transportation means based on a result of determining whether there is the shared transportation means parked in the local range within a predetermined distance based on the departure point.

Figure 10:
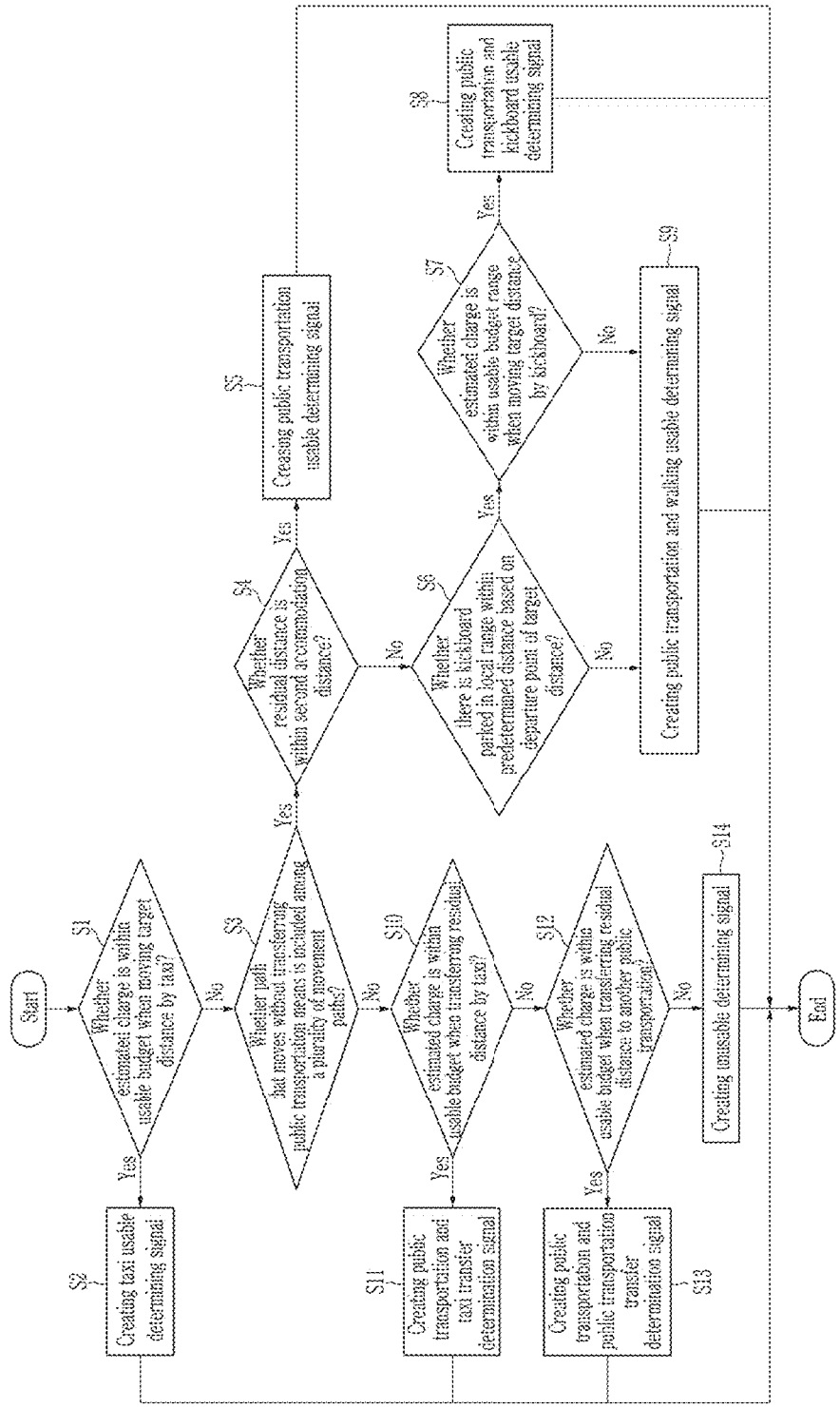
FIG. 10 is a detailed flowchart according to an embodiment in a step of determining whether to use a transportation means of FIG. 5.

FIG. 10 is a detailed flowchart according to an embodiment in a step of determining whether to use a transportation means of FIG. 5. FIG. 10 is the embodiment of the usage determining step of the transportation means when the priority of the transportation means is the order of the taxi, the public transportation, the kickboard, and walking.

The priority determining module 110 determines a plurality of transportation means in the order of the taxi, the public transportation, the kickboard, and walking, and determines the priority in the order of the taxi, the public transportation, the kickboard, and walking.

The taxi module 120 determines whether the estimated charge is within the usable budget when moving the target distance by the taxi (S1). If the estimated charge is within the usable budget, the taxi module 120 creates a taxi usable determining signal (52) and transmits it to the priority determining module 110.

If the estimated charge is not within the usable budget, the public transportation module 130 calculates whether a path that is used to move without transferring the public transportation means is included among a plurality of movement paths (S3).

If there is a path that can be used to move without transferring the public transportation means among a plurality of movement paths, the public transportation module 130 determines whether the residual distance is within a second accommodation distance (S4).

If the residual distance is within the second accommodation distance, the public transportation module 130 increases the public transportation usable determining signal (S5) and transmits it to the priority determining module 110.

If the residual distance is not within the second accommodation distance, the shared transportation module 140 determines whether there is a kickboard parked in a local range within a predetermined distance based on the departure point of the target distance (S6).

If there is no kickboard parked in the local range within a predetermined distance, the shared transportation module 140 creates a public transportation and walking usable determining signal (S9) and transmits it to the priority determining module 110.

If there is a kickboard parked in a local range within a predetermined distance, the shared transportation module 140 determines whether the estimated charge is within the usable budget range when moving the target distance by the kickboard (S7).

If the estimated charge is within the usable budget range when moving by the kickboard, the public transportation module 130 creates a public transportation and kickboard usable determining signal (S8) and transmits it to the priority determining module 110.

If the estimated charge is not within the usable range when moving by the kickboard, the public transportation module 130 creates a public transportation and walking usable determining signal (S9) and transmits the priority determining module 110.

If it is not possible to move without transferring to the public transportation in step (S3), the taxi module 120 determines whether the estimated charge is within the usable budget when transferring the residual distance by the taxi (S10).

When transferring to the taxi, if the estimated charge is within the usable budget, the taxi module 120 creates a public transportation and taxi transfer determination signal (S11) and transmits it to the priority determining module 110.

When transferring to the taxi, if the estimated charge is not within the usable budget, the public transportation module 130 determines whether the estimated charge is within the usable budget when transferring the residual distance to another public transportation unit (S12).

When transferring to another public transportation unit, if the estimated charge is within the usable budget, the public transportation module 130 creates a public transportation and public transportation transfer determination signal (S13) and transmits it to the priority determining module 110.

When transferring to another public transportation unit, if the estimated charge is not within the usable budget, the public transportation module 130 creates the unusable determining signal (S14) and transmits it to the priority determining module 110.

The remaining detailed description is the same as the description of S311-S344 of FIG. 6-FIG. 9.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

DESCRIPTION OF SYMBOLS

1: mobility service providing system
100: service providing terminal
110: priority determining module
120: taxi module
130: public transportation module
140: shared transportation means module
150: walking module
160: usage determining module
200: traffic API
210: bicycle API
220: kickboard API
230: taxi API
240: bus API
250: subway API
300: user terminal
310: application

What is claimed is:

1. A method of providing a mobility service, the method comprising:
receiving a user's personal information and service request information from a user terminal, and receiving a transportation mode data from a traffic application programming interface (API) through a service providing terminal;
determining a plurality of transportation modes whose priority is selected through the user terminal among available transportation modes according to a preference of the transportation modes included in the service request information through the service providing terminal;
deriving, through the service providing terminal, a plurality of movement paths which are paths to move by using any one of one or more public transportation modes from a stop of a respective one of the one or more public transportation modes, the stop included in a regional range within a predetermined regional distance based on a departure point, to an other stop of the respective one of the one or more public transportation modes, the other stop included in the regional range within the predetermined regional distance based on a destination, if the plurality of transportation modes include the public transportation mode;
determining whether there is a first public transportation mode capable of moving from the departure point to the destination without a transfer through the service providing among the plurality of movement paths;
determining whether a residual distance of a path through which the first public transportation mode moves exceeds an accommodation distance through the service providing terminal if there is a first public transportation mode capable of moving without transferring and if the plurality of transportation modes include a shared transportation mode; and
determining whether to use a combination of the first public transportation mode and a shared transportation mode among the plurality of transportation modes through the service providing terminal if the residual distance exceeds the accommodation distance,
wherein the residual distance is a distance obtained by adding a walking distance from the departure point to a boarding stop of the first public transportation mode and a walking distance from a getting-off stop of the first public transportation mode to the destination, and
wherein the accommodation distance is a predetermined distance that the user accepts to move by walking.

2. The method of claim 1, wherein
the determining of whether to use the combination of the first public transportation mode and the shared transportation mode includes
determining whether to use the shared transportation mode through the service providing terminal based on a comparison result of whether the estimated charge when moving from a departure point of the residual distance to a destination of the residual distance by the shared transportation mode is within a range of a second usable budget excluding the estimated charge when moving by the first public transportation mode from a first usable budget included in the service request information if there is a shared transportation mode parked in a local range within a predetermined distance based on the departure point of the residual distance.

3. The method of claim 1, further comprising
when there is no first public transportation mode from the departure point to the destination without transferring,
determining whether to move by a combination of a second public transportation mode and a third public transportation mode through the service providing terminal based on a comparison result of whether the estimated charge when moving from the departure point to the destination by a combination of the second public transportation mode and the third public transportation mode is within a range of a usable budget included in the service request information.

4. The method of claim 1, further comprising
when there is no first public transportation mode from the departure point to the destination without transferring,
determining whether to move by combining a second public transportation mode and a taxi mode through the service providing terminal based on a comparison result of whether the estimated charge when moving from the departure point to the destination by the combination of the second public transportation mode and the taxi mode is within a range of a usable budget included in the service request information.

5. The method of claim 1, further comprising
determining to move by combining the first public transportation mode and walking through the service providing terminal if the residual distance is less than the accommodation distance.

6. The method of claim 1, further comprising
if the plurality of transportation modes includes a taxi mode,
determining an estimated charge expected when moving from the departure point to the destination and determining whether to use the taxi mode based on a comparison result of whether the estimated charge is within a range of a usable budget included in the service request information through the service providing terminal.

7. The method of claim 1, further comprising
if the plurality of transportation modes include a shared transportation mode,
determining whether to move using the shared transportation mode from the departure point to the destination based on a result of determining whether there is a shared transportation mode parked in a local range within a predetermined distance based on the departure point through the service providing terminal.

8. The method of claim 7, wherein
the determining of whether to move using the shared transportation mode includes,
if there is a shared transportation mode parked in a local range within a predetermined distance based on the departure point,
determining an estimated charge expected when moving using the shared transportation mode from the departure point to the destination and determining whether to use the shared transportation mode based on a comparison result of whether the estimated charge is within a range of a usable budget included in the service request information through the service providing terminal.

9. A mobility service providing system, the system comprising:
a service providing server configured to determine a plurality of transportation modes whose priority is selected through a user terminal among available transportation modes according to a preference of the transportation modes included in service request information received from the user terminal, and configured to determine a transportation mode to be used among the plurality of transportation modes to provide a movement path using the transportation modes through an application; and
a traffic application programming interface (API) configured to transmit transportation mode data including an estimated charge for each transportation mode to the service providing terminal according to a request of the service providing terminal,
wherein the service providing server is configured to
derive a plurality of movement paths which are paths to move by using any one of one or more public transportation modes from a stop of a respective one of the one or more public transportation modes, the stop included in a regional range within a predetermined regional distance based on a departure point, to an other stop of the respective one of the one or more public transportation modes, the other stop included in the regional range within the predetermined regional distance based on a destination, if the plurality of transportation modes include the public transportation mode,
determine whether there is a first public transportation mode capable of moving from the departure point to the destination without a transfer through the service providing terminal among the plurality of movement paths,
determine whether a residual distance of a path through which the first public transportation mode moves exceeds an accommodation distance through the service providing terminal if there is a first public transportation mode capable of moving without transferring and if the plurality of transportation modes include a shared transportation mode, and
determine whether to use a combination of the first public transportation mode and a shared transportation mode among the plurality of transportation modes through the service providing terminal if the residual distance exceeds the accommodation distance,
wherein the residual distance is a distance obtained by adding a walking distance from the departure point to a boarding stop of the first public transportation mode and a walking distance from a getting-off stop of the first public transportation mode to the destination, and
wherein the accommodation distance is a predetermined distance that the user accepts to move by walking.

10. The system of claim 9, wherein
the service providing server is further configured to:
receive a user's personal information and service request information from the user terminal and receive transportation mode data from the traffic API to determine the plurality of transportation modes according to a preference of the transportation modes included in the service request information; and
create a signal indicating whether to use each transportation mode included in the plurality of transportation modes when moving from a departure point to a destination if a signal of the plurality of transportation modes is determined.

11. The system of claim 10, wherein
the service providing server is further configured to:
determine whether to use a taxi mode from the departure point to the destination if the plurality of transportation modes include a taxi mode;
determine whether to use a public transportation mode from the departure point to the destination if the plurality of transportation modes include a public transportation mode;
determine whether to move from the departure point to the destination by walking if the plurality of transportation modes include walking; and
determine whether to use a shared transportation mode from the departure point to the destination, if the plurality of transportation modes include a shared transportation mode.

12. The system of claim 11, wherein
the service providing server is further configured to:
if the plurality of transportation modes includes the public transportation mode, determine whether there is a first public transportation mode that can move without transferring when moving from the departure point to the destination by public transportation;
when there is no first public transportation mode to move without transfer, determine whether an estimated charge when moving by a combination of a second public transportation mode and a third public transportation mode from the departure point to the destination is within a range of a usable budget included in the service request information; and
determine whether to use the combination of the second public transportation mode and the third public transportation mode from the departure point to the destination based on the determination of whether the estimated charge is within the range of the usable budget.

13. The system of claim 11, wherein
the service providing server is further configured to:
determine whether there is a first public transportation mode that can move without transferring when moving from the departure point to the destination by the public transportation if the plurality of transportation modes include the public transportation mode;
determine whether an estimated charge when moving by a combination of a second public transportation mode and the taxi mode from the departure point to the destination is within a range of a usable budget included in the service request information when there is no first public transportation mode; and
determine whether to use the combination of the second public transportation mode and the taxi mode from the departure point to the destination based on the determination of whether the estimated charge is within the range of the usable budget.

14. The system of claim 11, wherein
the service providing server is further configured to determine whether to use a shared transportation mode based on a result of determining whether there is a shared transportation mode parked in a local range within a predetermined distance based on the departure point if the plurality of transportation modes include the shared transportation mode.

15. The system of claim 14, wherein
the service providing server is further configured to:
determine an estimated charge expected when moving from the departure point to the destination by using the shared transportation mode if there is a shared transportation mode parked in a local range within a predetermined distance based on the departure point; and
determine whether to use the shared transportation mode based on a comparison result of whether the estimated charge is within the range of the usable budget included in the service request information.

16. The system of claim 11, wherein
the service providing server is further configured to determine whether to move by combining walking and a shared transportation mode based on a result of determining whether to use the shared transportation mode if a walking distance from the departure point to the destination is within a predetermined range when the plurality of transportation modes include walking.

* * * * *